Figure 1:
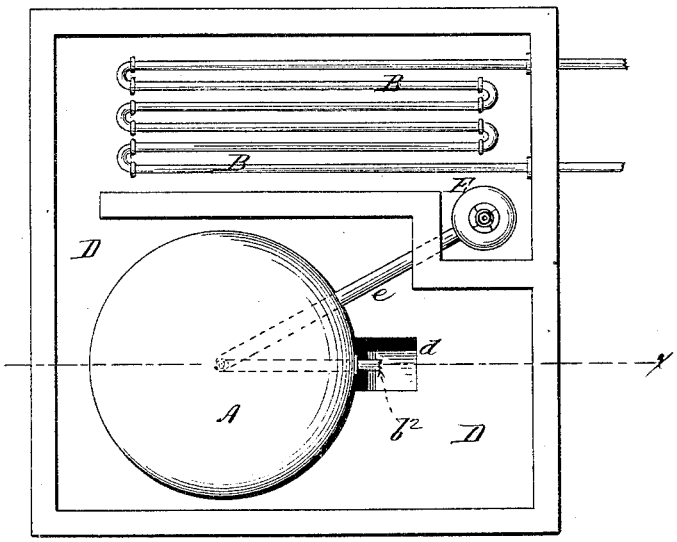

(No Model.)

C. C. PECK.
PROCESS OF MANUFACTURING SALT.

No. 426,142.    Patented Apr. 22, 1890.

Witnesses:
Geo. W. Miatt
D. W. Gardner

Inventor:
Cassius C. Peck

UNITED STATES PATENT OFFICE.

CASSIUS C. PECK, OF WARSAW, NEW YORK.

PROCESS OF MANUFACTURING SALT.

SPECIFICATION forming part of Letters Patent No. 426,142, dated April 22, 1890.

Application filed October 14, 1889. Serial No. 327,032. (No specimens.)

*To all whom it may concern:*

Be it known that I, CASSIUS C. PECK, a citizen of the United States, residing at Warsaw, in the county of Wyoming and State of New York, have invented certain new and useful Improvements in the Process of Manufacturing Salt, of which the following is a specification sufficient to enable others skilled in the art to which the invention appertains to use the same.

My invention relates especially to the method of making salt from brine by evaporation, although it is applicable to the evaporation of other liquids; and it consists, primarily, in augmenting evaporation by heating the brine under atmospheric pressure and forcibly circulating it through and between the heating-tank and a vacuum-chamber, in which latter the brine is thereby maintained at nearly the same temperature as that in the heating-tank, and, secondarily, in utilizing the forced circulation of the heated brine for the purpose of automatically collecting and removing the solid products of evaporation from the vacuum-chamber.

Salt is usually made by evaporating brine in shallow pans, or else in kettles with fire underneath, or in shallow wooden tanks, called "grainers," which are heated by steam-pipes; also, in a few instances in steam-jacketed kettles. In all these cases the evaporation proceeds comparatively slowly, while the salt precipitated from the hot brine has to be lifted out of the evaporating apparatus by hand.

I am aware that certain devices have been patented for automatically discharging salt from evaporating apparatus; but I am not aware that a forced circulation of the brine itself has heretofore been utilized to effect the removal of the solid products of evaporation from a vacuum-chamber. Neither am I aware that a forced circulation of liquid to be evaporated has heretofore been established between the vacuum-chamber and an exterior heating-surface.

A distinguishing feature of my invention thus consists in locating the heating-surface outside of the evaporating apparatus and establishing a rapid circulation of brine between said heating-surface and the evaporating apparatus. The effect of this arrangement is to make the heating-surface accessible at all times for cleaning without interruption of the process of evaporation, and also to cause the deposit of the salt precipitated by evaporation to occur in the evaporating apparatus and removed from the heating-surface, so that the latter is not clogged and rendered ineffectual by such deposit, as is the case in other kinds of evaporating apparatus, while the rapid forced circulation of the brine maintains said brine at nearly the same temperature in the evaporating apparatus as in the pan or tank, where it is in contact with the heating-coil, and by causing the greatest possible amount of heat to be conveyed away from the heating-coil gives to this its maximum efficiency and augments the amount of evaporation, which can ordinarily be effected with a given amount of heating-surface, at the same time effecting the collection of the solid products of evaporation and their removal and delivery into a well or basin in convenient situation for removal by ordinary conveying mechanism.

The subject-matter of the present application is set forth in application, Serial No. 306,239, for patent filed April 6, 1889, for a continuous process of manufacturing salt, in which process the features herein claimed are incidentally included. In an application, Serial No. 306,238, for patent filed April 6, 1889, concurrent herewith, I also show substantially the same evaporating apparatus as that represented in the present application, for the purpose of illustrating my improved process; but I do not seek to cover herein the mechanical construction of such apparatus.

In the accompanying drawings I show apparatus suitable for carrying out my process practically, although I do not wish to confine myself to the use of any special form of apparatus, since it is obvious that various modifications may be made therein without deviating from the essential features of my invention.

Figure 2:
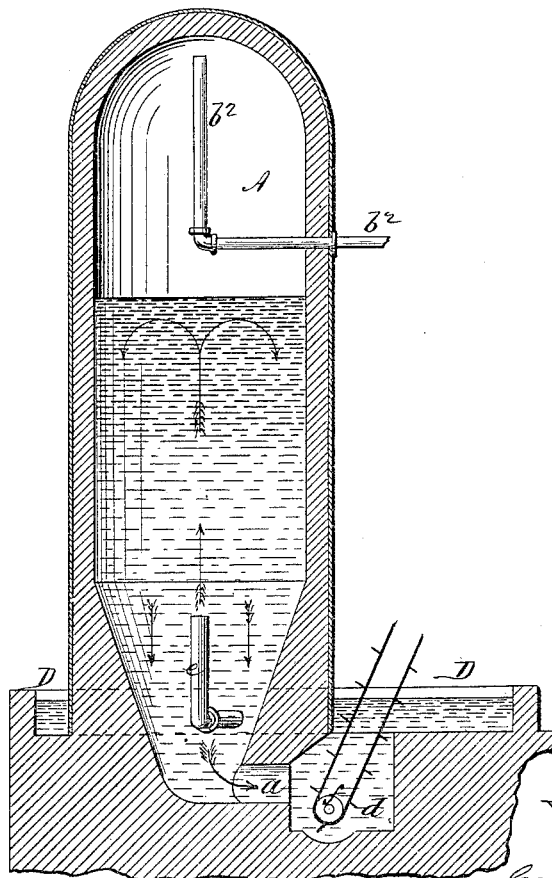

Figure 1 is a plan of apparatus adapted to the requirements of my improved process; and Fig. 2, a vertical section thereof upon plane of line *x x*, Fig. 1.

A is a vacuum-chamber, in which salt is separated from brine by evaporation. The vacuum-chamber is set in a tank D, which is provided with a basin or pocket *d* at the base of the chamber, into which the belt or chain of a conveyer enters, the said belt or chain being carried around pulley $f$, and being connected with and driven by a pulley above.

B is a steam-pipe coil; E, a centrifugal pump connected with the lower part of vacuum-chamber A by pipe $e$.

$b^2$ is a pipe connecting the upper part of the chamber A with a vacuum-pump. (Not shown.) The arrows indicate the circulation of the brine.

The operation is as follows: Brine in the tank D is heated by the steam-pipe coil B and forced by the centrifugal pump E into the lower part of the vacuum-chamber A through the pipe $e$, a partial vacuum being meantime maintained in the upper part of the chamber A by means of an ordinary vacuum-pump acting through the pipe $b^2$, the liquid-level in the chamber A depending upon the degree of perfection of vacuum maintained. The action of the centrifugal pump E has little influence upon said level, for the brine is free to flow out through the opening $a$ at the bottom of the chamber A, and will flow out as soon as the level is raised by the centrifugal pump above that due to the existing vacuum.

The pump E is intended to be of sufficient size and to be run at sufficient speed to insure a rapid circulation of brine between the vacuum-chamber A and the tank D, to the end that the temperature of the brine in the chamber A shall be kept at nearly the temperature of that in contact with the heating-coil B, so as to make the evaporation in the vacuum-chamber A as rapid as possible, and to make the outflowing current so rapid that it shall sweep all salt precipitated from the boiling brine down the converging lower sides of the chamber A and out through the opening $a$ into the basin $d$. The basin $d$ being formed to afford a comparatively large area, the current of brine becomes correspondingly slow, which allows the salt to settle out of the brine, to be removed by the conveyer.

What I claim, and desire to secure by Letters Patent, is—

1. The process herein set forth of augmenting the evaporation of brine or other liquid in vacuum apparatus, consisting in heating the liquid under atmospheric pressure and forcibly circulating it through and between the open heating-tank and the vacuum-chamber, substantially in the manner described.

2. In the manufacture of salt and evaporation of liquids leaving solid residuum, the process herein described of removing the solid products of evaporation from the vacuum-chamber by a forced circulation of brine or other liquid being evaporated through and between said vacuum-chamber and a tank in which the brine or other liquid is heated under atmospheric pressure, substantially in the manner and for the purpose set forth.

CASSIUS C. PECK.

Witnesses:
WM. E. MILLER,
FRANK E. NORTON.